United States Patent [19]

Michaels

[11] Patent Number: 5,420,925
[45] Date of Patent: May 30, 1995

[54] ROLLING CODE ENCRYPTION PROCESS FOR REMOTE KEYLESS ENTRY SYSTEM

[75] Inventor: Paul A. Michaels, Livonia, Mich.

[73] Assignee: Lectron Products, Inc., Rochester Hills, Mich.

[21] Appl. No.: 205,328

[22] Filed: Mar. 3, 1994

[51] Int. Cl.⁶ .............................................. H04K 1/00
[52] U.S. Cl. .................................. 380/23; 380/46; 380/21
[58] Field of Search .................. 380/21, 23, 46, 49, 380/4

[56] References Cited

U.S. PATENT DOCUMENTS

| | | |
|---|---|---|
| 4,535,333 | 8/1985 | Twardowski . |
| 4,596,985 | 6/1986 | Bongard et al. . |
| 4,652,860 | 3/1987 | Weishaupt et al. . |
| 4,686,529 | 8/1987 | Kleefeldt . |
| 4,825,210 | 4/1989 | Bachhuber et al. . |
| 4,928,098 | 5/1990 | Dannhaeuser . |
| 4,942,393 | 7/1990 | Waraksa et al. . |
| 5,055,701 | 10/1991 | Takeuchi . |
| 5,196,840 | 3/1993 | Leith et al. ............... 380/21 |
| 5,293,576 | 3/1994 | Mihm et al. .............. 380/21 |
| 5,319,705 | 6/1994 | Halter et al. ............. 380/4 |

FOREIGN PATENT DOCUMENTS

2181465  4/1987  United Kingdom .

OTHER PUBLICATIONS

Patent Application Serial No. 07/885,624, filed May 18, 1992, entitled "Passive Keyless Entry System", inventor Thomas J. Waraksa et al., and assigned to Lectron Products, Inc.

Primary Examiner—David C. Cain
Attorney, Agent, or Firm—Harness, Dickey & Pierce

[57] ABSTRACT

An encryption process for a rolling code of a remote keyless entry system. The encryption process makes use of a command code shift register, a security code shift register, and a sequence code shift register in which the contents of these registers is transmitted from a portable transmitter to a receiver associated with the vehicle in order to perform a desirable function. The command code shift register provides the code of the function to be performed and the sequence code shift register provides a sequence code for updating the sequence of the receiver. The security code shift register includes a security code which is updated by a first and second pseudo random number generator after each transmission. Each of two pseudo random number generators include associated shift registers and exclusive NOR gates such that a first bit location and a tap bit location of each of the shift registers are exclusively NORed to provide a first bit location in the shift register. A series of the bit locations of the first and second shift registers are exclusively ORed together to set the bits of the security code register.

30 Claims, 1 Drawing Sheet

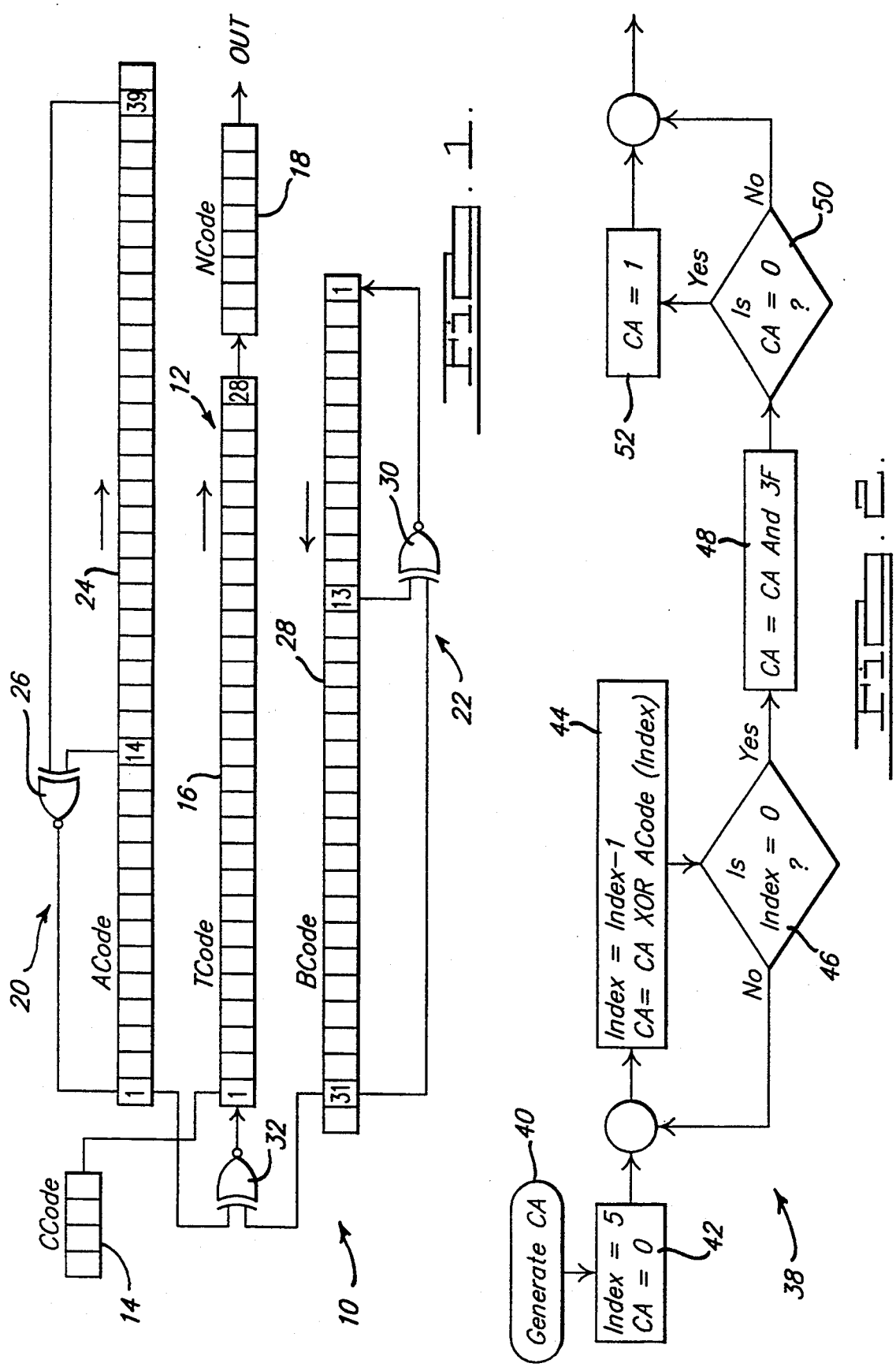

ROLLING CODE ENCRYPTION PROCESS FOR REMOTE KEYLESS ENTRY SYSTEM

BACKGROUND AND SUMMARY OF THE INVENTION

This invention relates generally to an encryption process for a remote keyless entry system and, more particularly, to an encryption process for a remote keyless entry system that includes a rolling code updating scheme that provides heightened security integrity against unwanted entry.

Vehicle remote keyless entry system that enables a vehicle operator to perform certain functions, such as lock or unlock a door or trunk of the vehicle, from a remote location are known in the art. Keyless entry systems of this type generally include a portable transmitter carried by the vehicle operator, usually included as part of a fob attached to a key chain for carrying keys of the vehicle. The transmitter will include a button that, upon activation, will cause the transmitter to broadcast a radio frequency signal as a series of coded data bits. If the vehicle is within the operating range of the transmitter, an antenna and receiver associated with the vehicle will receive the coded signal. If the receiver determines the coded signal to be valid, then the receiver will automatically cause the desired function to be performed as encoded on the signal. A more complete discussion of remote keyless entry systems of this type can be found in U.S. Pat. No. 4,942,393, issued Jul. 17, 1990, and assigned to the assignee of this invention.

Because of at least the advantage of convenience that is attributable to controlling vehicle functions in this manner, keyless entry systems are becoming increasingly more common for use in remotely unlocking or locking vehicle doors as the vehicle operator approaches or leaves the vehicle. As more and more vehicles are being equipped with keyless entry systems, the occasions where vehicle thieves are attempting to duplicate the coded transmissions to gain access to the vehicle are also increasing. Consequently, it has become necessary to incorporate more rigorous encoding techniques for coding the transmitted signal to prevent potential thieves from gaining access to the coded transmission signal.

One method in which a potential thief can gain knowledge of the coded transmission is by recording the transmitted signal after the vehicle operator has activated the transmitter. The thief can then play the recorded signal back at a time when the operator is not in the vicinity of the vehicle in order to fraudulently gain access to the vehicle. In order to prevent a previously recorded transmission from being a valid signal, it is known to use encoding techniques that provide rolling codes so that the signal code changes with each transmission. In these types of systems, the receiver must also systematically update its code so as to be able to synchronize with the transmitter signal.

The availability of sophisticated recording devices and cryptanalysis algebraic techniques that can readily be implemented with portable computers make it increasingly possible for professional thieves to break conventional rolling codes. In particular, it is possible to decipher many rolling codes by recording successive transmissions from a transmitter, thereby enabling a thief to anticipate future valid codes. Further, advanced transmitting devices are capable of transmitting large numbers of sequential codes over relatively short periods of time. Therefore, schemes can be devised to update a transmitted signal in a systematic manner in order to eventually hit on the right combination of coded bits.

Accordingly, it is an object of the present invention to provide an encoding technique that generates a rolling code for use in a keyless entry system for a vehicle that will prevent unwanted entry of the vehicle by recording the coded transmission.

It is a further object of the present invention to provide an encoding technique that is adaptable to update a rolling code used in a keyless entry system for a vehicle that will prevent unwanted entry of the vehicle by recording and analyzing a series of successive coded transmissions even if a code breaker uses sophisticated cryptanalysis algebraic techniques.

It is also an object of the present invention to provide an encoding technique that is adaptable to update a rolling code used in a keyless entry system for a vehicle that will prevent unwanted entry of the vehicle even if the coding encryption and decryption algorithms are in the public domain.

It is yet another object of the present invention to provide an encoding technique that is adaptable to update a rolling code used in a keyless entry system for a vehicle that will prevent unwanted entry of the vehicle by random successive coded transmissions over a reasonable period of time.

In accordance with the teachings of the present invention, a rolling code encryption process for a remote keyless entry system is disclosed. The encryption process makes use of a command code shift register, a security code shift register, and a sequence code shift register for establishing a series of encoded data bits where the data bits are transmitted from a portable transmitter to a receiver associated with a vehicle in order to perform a certain function remotely from the vehicle, such as unlock or lock the vehicle's door. The command code shift register provides the portion of the transmitted data bits that define the function to be performed. The sequence code shift register provides the portion of the transmitted data bits that continually updates a sequence number so as to enable the receiver to be synchronized with the transmitter. In a preferred embodiment, neither the command code data bits nor the sequence code data bits are encrypted.

The security code shift register provides the portion of the transmitted data bits which is encrypted in a rolling manner so as to prevent a would-be code breaker from gaining knowledge of the transmitted signal. The encrypted bits in the security code shift register are set by a first and second pseudo random number generator. The first and second pseudo random number generators each include a shift register whose bits are set by exclusively NORing a tap bit location of the shift register with an end bit location of the shift register. The tap bit locations are selected so as to maximize the number of bit sequences that can be generated before the series will repeat itself. Predetermined bit locations from the shift registers associated with the pseudo random number generators are exclusively ORed together, and the outputs of the OR gates set the individual bits in the security code register. The shift registers are cycled after each transmission a number of times depending on the contents of the shift register in order to reset them to a new code pattern before the shift registers are exclusively ORed together. In this manner, the security code register is updated each time the transmitter is activated.

Additional objects, advantages, and features of the present invention will become apparent from the following description and appended claims, taken in conjunction with the accompanying drawings.

BRIEF DESCRIPTION OF THE DRAWINGS

FIG. 1 is a functional diagram of bit locations for a rolling code updating scheme according to a preferred embodiment of the present invention; and FIG. 2 is a flow chart diagram of the cycling sequence for the pseudo random number generators associated with the ACODE register of FIG. 1. The cycling sequence for the BCODE register is similar.

DETAILED DESCRIPTION OF THE PREFERRED EMBODIMENTS

The following discussion concerning an encryption process for a remote keyless entry system for a vehicle is merely exemplary in nature and is in no way intended to limit the invention or its applications or uses.

With this in mind, the discussion below refers to an encryption process applicable to be used in a remote keyless entry system for a vehicle in which a hand-held portable transmitter (not shown) transmits a coded radio frequency signal consisting of a stream of data bits to a receiver (not shown) associated with a vehicle (not shown) such that the receiver will decode the signal to determine if it is valid, and then perform the desired function. The data bits are transmitted in accordance with different data carrier modulation techniques such as, but not limited to, phase shift keying, frequency shift keying, amplitude modulation, frequency modulation, or pulse code modulation. The coded signal is encoded in a rolling manner in that the signal code changes each time the transmitter sends a signal. The hand-held transmitter generally includes a number of command or function buttons such that a vehicle operator can select different functions, such as locking or unlocking the vehicle doors, unlocking the trunk, etc. The encoded data bits will therefore include instructions as to which function is desired. Specific hardware and software implementations of a remote keyless entry system which can perform the below described rolling code feature are known in the art and can be found for example in U.S. patent Ser. No. 07/885,624 filed May 18, 1992 and assigned to the assignee of the present invention.

Turning to FIG. 1, an encoding system 10 is shown as a series of shift registers and logic gates in order to depict an encoding technique according to a preferred embodiment of the present invention. A main shift register 12 is shown consisting of 40 bit locations where the individual boxes represent the bit locations. The main register 12 is separated into three separate sub-shift registers. These sub-shift registers include a 4-bit command code shift register 14, a 28-bit security code shift register 16, and an eight-bit sequence code shift register 18. The command code shift register 14 includes command code data bits (CCode) that define the desired function to be performed as determined by the function buttons on the transmitter when activated by the vehicle operator. The sequence code shift register 18 includes sequence data bits (NCode) which provide a count update accounting for the number of times the system 10 has been cycled. This enables the receiver to update its decoding scheme when it receives a valid signal from the transmitter so that the receiver knows how many times the transmitter has been actuated since the last time the receiver received a valid coded signal. In other words, the vehicle operator may inadvertently activate the command buttons while out of range of the vehicle, or some other event may happen to cause the count sequence of the transmitter to advance without the receiver counter advancing. As will be discussed in detail below, the security code shift register 16 includes security data bits (TCode) which are updated each time the system 10 is cycled (function button is activated) so as to increase the integrity of the system 10 against the efforts of a would-be thief attempting to duplicate the encoded signal. The command code and the sequence code are preferably not encoded and therefore transmitted as "clear" code.

When a command button on the transmitter is activated, the shift register 14 will be filled with the associated 4-bit command code defining the desired function to be performed. A four bit command code register provides for 16 different functions. The shift register 16 will already include an updated security code and the shift register 18 will already include the appropriate sequence code. The main register 12 will then sequentially shift out all of the data to an RF data link module (not shown) associated with the transmitter in the order of NCode, TCode, and CCode to be transmitted to the receiver. After the 40 data bits are shifted out of the register 12, the number in the sequence shift register 18 is incremented by one, and the 28-bit security code is replaced by an updated security code to be sent the next time a function button is activated in a manner to be discussed below. Since the sequence shift register 18 is an 8-bit register, the transmitter can be activated up to 256 times while out of range of the receiver before the receiver will be unable to determine if the transmitted signal is indeed valid.

In order for the encoded data signal to be rigorous enough to satisfy the above expressed objectives, an encoding technique has been devised to provide a very large number of different possible security bit combinations in which each successive combination is determined by the previous contents of the shift register. Therefore, even if the coding procedure for updating the security bits is known, the information cannot be used to decipher the code without knowledge of the actual bit values. In the present system, the sequence of security bits in the register 16 is set by a 39-bit ACode pseudo-random number generator 20 and a 31-bit BCode pseudo-random number generator 22. The ACode generator 20 includes a 40-bit shift register 24 and an XNOR gate 26, and the BCode generator 22 includes a 32-bit shift register 28 and an XNOR gate 30. The 40th bit location of the ACode register 24 and the 32nd bit location of the BCode register 28 are not used for reasons that will be discussed below.

For reasons which will become apparent from the discussion below, each time the ACode register 24 is cycled, the 14th bit location and the 39th bit location of the ACode register 24 are exclusively NORed by the XNOR gate 26, the output of the XNOR gate 26 is applied to the first bit location of the ACode register 24, and the contents of the register 24 are shifted over one position, and the last bit is discarded. Likewise, each time the BCode register 28 is cycled, the 31st bit location and the 13th bit location are exclusively NORed by the XNOR gate 30, the output of the XNOR gate 30 is applied to the first bit location of the BCode register 28, and the contents of the register 28 are shifted over one position and the last bit is discarded. As XNOR gates 26 and 30 are used, all "1's" cannot be a valid code. If XNOR gates 26 and 30 are replaced with XOR gates, then all "0's" cannot be a valid code.

Each time the shift register 16 is cycled, a series of XOR gates 32, in the preferred embodiment twenty-eight, exclusively-OR the first 28 bits of the register 24 with the last 28 bits of the register 28 and the resulting values are loaded into register 16. Particularly, the 1st bit location of the register 24 is exclusively ORed with the 31st bit location of the register 28, the 2nd bit location of the register 24 is exclusively ORed with the 30th bit location of the register 28, the third bit location of the register 24 is exclusively ORed with the 29th bit location of the register, and so on. For clarity reasons, only one XOR gate 32 is shown in FIG. 1. However, it will be understood that 27 other XOR gates 32 would be included to exclusively OR each bit location of the register 24 with the corresponding bit location of the register 28. As is apparent, the shift registers 24 and 28 are preferably shifted in opposite directions with respect to the bit locations in the shift register 16.

Thus, it will be appreciated that since the contents of the TCode are determined from less than all of the data bits in the ACode and BCode, one monitoring or recording the encoded data transmissions from the transmitter will be receiving information on less than the entire contents of the ACode and BCode, thus making the present encoding scheme much more difficult to decipher.

The 14th bit location and the 39th bit location of the register 24 are exclusively NORed and the shift register 24 is shifted a predetermined number of cycles as discussed above before the bit locations of the register 24 are permitted to be exclusively ORed with the corresponding bit locations of the register 28. FIG. 2 shows a flow chart diagram 38 used to determine how many times the register 24 is cycled before it is ready to be exclusively ORed with the register 28. The number of cycle times is designated as an 8-bit number "CA".

A first step 40 initiates the cycling time sequence each time the contents of the shift register 12 are shifted out. Once the cycling time sequence is initiated, a next step 42 sets the number of bytes in the register 24 as an index number and sets CA to zero. For the shift register 24, there are five bytes. Once the index number and CA are set, a next step 44 systematically exclusively OR's CA with each byte in the register 24, beginning with the first byte. The index number is decreased by one each time a byte is exclusively ORed. More particularly, because CA is originally set to zero, the first eight bits of the register 24 are exclusively ORed with all zeros. The resulting value will therefore be the values of these first bits as they appear in the register 24. A step 46 then determines if the index number is zero. Since at this time the index number has only been reduced to four, the answer is "No" and the process is returned to the step 44. This time, CA is the value of the bits in the first eight locations of the register 24. These bits are then exclusively ORed with the next eight bits in that register. This process continues until each of the bytes of the register 24 are exclusively ORed together and the index number is zero.

The process is then transferred to a step 48 which ANDs the final value of CA with the hex value 3F. By ANDing CA with hex 3F (00111111) the two most significant bits of the eight bits of CA are masked to set a maximum possible cycling number at $2^6-1$ or 63. In other words, CA will end up being a number between 0 and 63. By masking more or less of the bits of CA, the number of different cycling times can be changed. If CA ends up being zero, as determined by a step 50, then CA is set to "1" as shown by step 52 because the value "0" is invalid. A number other than "1" can also be used. Likewise, a cycling value CB is determined to set the number of times the register 28 is cycled in the same manner as shown in FIG. 2. However, the register 28 has only four bytes, and therefore the index number is set accordingly. As is apparent, the number of times the shift register 24 and 28 are cycled depends on their contents at any given time. Significantly, this step in the coding process adds non-linearity to the system which precludes one from breaking the code with a small number of sequence contiguous code samples even if the coding algorithm is known.

As mentioned above, one of the objects of the present rolling code encryption technique is to prevent a would-be code breaker from hitting upon the right sequence of bits simply by continuously and randomly transmitting a sequence of bits over a reasonable period of time. For this reason, the length of the shift registers 24 and 28 are selected to be 39 and 31 bits, respectively. Thirty-nine bits establishes a maximum binary code length for register 24 of $2^{39}-1$ or 549,755,813,887, and 31 bits establishes a maximum binary code length for register 28 of $2^{31}-1$ or 2,147,483,647. Because there are no common factors between these two numbers, the effective binary code length of the combined shift register 16 is equal to their product, or approximately $2^{70}$. Therefore, approximately $1.1806 \times 10^{21}$ sequential coded transmissions would have to be sent before the code will repeat itself.

As just discussed, the length of the shift registers 24 and 28 selected establishes the maximum number of different possible encoded transmissions. Consequently, if it is assumed that it is possible to make five transmissions per second, it would take a transmitter set up to sequence through all possible codes approximately $7.5 \times 10^{12}$ years of continuous operation to transmit every possible code. However, if other specifications are required, the length of the shift registers 24 and 28, as well as the shift register 16, can be changed to increase or decrease this duplicate transmission requirement. Given below in Table 1 is a list of shift register lengths in bit locations (N) in the left column and the factors for each associated binary code length in the right column, where the binary code length is $2^N-1$. Note that each of the factors is a prime number. The middle column provides the alternative tap bit locations which must be used for the exclusive NORing step in order to provide the maximum code length. The tap locations were determined by an empirical trial and error process that generated maximum code length. The tap bit locations are mirror images in that the tap locations can be counted from either end of the register. By selecting two register lengths having no common factors, the maximum code length—i.e., the number of different code sequences before the code repeats itself—is maximized.

TABLE I

| LENGTH (N) | TAPS | BINARY LENGTH FACTORS |
|---|---|---|
| 2 | 1 | 3 |
| 3 | 1 | 7 |
| 4 | 1 | 3, 5 |

TABLE I-continued

| LENGTH (N) | TAPS | BINARY LENGTH FACTORS |
|---|---|---|
| 5 | 2 | 31 |
| 6 | 1 | 3, 3, 7 |
| 7 | 1, 3 | 127 |
| 9 | 4 | 7, 73 |
| 10 | 3 | 3, 11, 31 |
| 11 | 2 | 19, 107 |
| 15 | 1, 4, 7 | 7, 31, 151 |
| 17 | 3, 5, 6 | 131071 |
| 18 | 7 | 3, 3, 3, 7, 19, 73 |
| 20 | 3 | 3, 5, 5, 11, 31, 41 |
| 21 | 2 | 7, 7, 127, 337 |
| 22 | 1 | 3, 23, 89, 683 |
| 23 | 5, 9 | 47, 178481 |
| 25 | 3, 7 | 31, 601, 1801 |
| 28 | 3, 9, 13 | 3, 5, 29, 43, 113, 127 |
| 29 | 2 | 233, 1103, 2089 |
| 31 | 3, 6, 7, 13 | 2147483647 |
| 33 | 13 | 7, 23, 89, 599479 |
| 35 | 2 | 31, 71, 127, 122921 |
| 36 | 11 | 3, 3, 5, 7, 13, 19, 37, 73, 109 |
| 39 | 4, 8, 14 | 7, 79, 8191, 121369 |
| 41 | 3, 20 | 13367, 164511353 |
| 47 | 5, 14, 20, 21 | 2351, 4513, 13264529 |
| 49 | 9, 12, 15, 22 | 127, 4432676798593 |

As is apparent from the discussion above, the lengths of shift registers 24 and 28 were selected to achieve the maximum code length desired. Note, if lengths with common factors were selected, such as 33 and 39, the resulting effective code length would be reduced by the common factor "7". Consequently, such a selection would add circuit complexity without achieving a corresponding benefit in an increase in the number of possible different codes.

In order to reduce the receiver code interpretation response time, the 8 bits of the sequence code register 18 are preferably not encrypted, and thus are transmitted in clear code. An attempt to encrypt the sequence code is believed to be a tactical mistake in that this code supplies information to a would-be code breaker along with a subsumed plain text equivalent. Likewise, the 4 bit command code in the register 14 is also transmitted as clear code. As with the sequence code, it is believed to be better not to encrypt the command code in order to limit the amount of subsumed plain text available to a would-be code breaker.

In order to synchronize the receiver to the transmitter, the 40 bits of the shift register 24, the 32 bits of the shift register 28 and the eight bits of the shift register 18 must be coupled to the receiver. The four bits of the shift register 14 and the 28 bits of the shift register 16 contain only transient data and do not need to be copied to the receiver. The coupling between the transmitter and the receiver can be accomplished as follows. The contents of the shift register 18 are rolled around with the carry bit copied to the output driver. Next, the contents of the shift register 24 are rolled around with the carry bit also copied to the output driver. And then the contents of the shift register 28 are rolled around with the carry bit copied to the output driver. This procedure corresponds to a common 72 bit seed code for both the transmitter and the receiver, and a common sequence number somewhere between 0 and 255. The principal advantage of this procedure is that it can process the 80 bits of synchronization data in 8-bit byte quantities, which is convenient for combinational logic custom chip circuits. An alternate procedure, more suitable for common low-cost automotive class microcomputers, is to simply sequentially copy the ACode, BCode, and NCode data as byte quantities to a common output byte side shift register which is common for normal code output as well as receiver synchronization. The bytes are then shifted out in groups of 8, reloaded with the next byte, etc., until the ten significant data bytes have been transmitted.

The description of the preferred embodiment above has been described as a circuit. However, each of the functions described above has an equivalent software counterpart, and therefore may be implemented in this fashion.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in following claims.

What is claimed is:

1. A method of generating a sequence of encoded data bits for a remote keyless entry system, said method comprising the steps of:
   providing a first pseudo random number generator including a first shift register having a predetermined number of bit locations and a first logic gate;
   cycling the first pseudo random number generator a first number of times, said step of cycling the first pseudo random number generator including the step of combining two predetermined bit locations of the first shift register through said first logic gate and applying the result to the first bit location of the first shift register;
   providing a second pseudo random number generator including a second shift register having a predetermined number of bit locations and a second logic gate;
   cycling the second pseudo random number generator a second number of times, said step of cycling the second pseudo random number generator including the step of combining two predetermined bit locations of the second shift register through said second logic gate and applying the result to the first bit location of the second shift register; and
   combining through a plurality of third logic gates each bit location of a series of bit locations of the first shift register with each corresponding bit location of a series of bit locations of the second shift register and applying the results to bit locations in a security code register.

2. The method according to claim 1 wherein the step of cycling the first pseudo random number generator includes the step of cycling the first pseudo random number generator a number of times depending on the contents of the first register.

3. The method according to claim 1 wherein the step of cycling the second pseudo random number generator includes the step of cycling the second pseudo random number generator a number of times depending on the contents of the second register.

4. The method according to claim 1 wherein the step of combining the series of bit locations of the first register and the corresponding series of bit locations of the second register includes the step of combining a number of bits of the first and second shift registers that is less than the number of bits in at least one of the first shift register or the second shift register.

5. The method according to claim 1 further comprising the step of providing a command code shift register, said command code shift register containing a command code for performing a desirable function upon activation of the keyless entry system.

6. The method according to claim 1 further comprising the step of providing a sequence code shift register, said step of outputting the contents of the security code register including the steps of outputting the contents of the security code register and the sequence code register and updating the sequence code register by one.

7. The method according to claim 4 wherein the first shift register has 39 bit locations, the second shift register has 31 bit locations, and the security code register has 28 bit locations.

8. A system for generating a sequence of encoded data bits for a remote keyless entry system, said system comprising:
a first pseudo random number generator including a first shift register having a predetermined number of bit locations and a first logic gate, wherein the bit values of each bit location of the first shift register are determined by combining through said first logic gate a tap bit location with a predetermined bit location of the first shift register, applying the output from said first logic gate to the first bit location of the first shift register and shifting the other bits over one position;
a second pseudo random number generator including a second shift register having a predetermined number of bit locations and a second logic gate, wherein the bit values of each bit location of the second shift register are determined by combining through said logic gate a tap bit location and a predetermined bit location of the second shift register, applying the output from said second logic gate to the first bit location of the second bit register and shifting the other bits over one position; and
a security code register having a predetermined number of bit locations, wherein the bit values of the bit locations of the security code register are determined by a series of logic gates, said series of logic gates combining each bit location of a series of bit locations of the first shift register and a series of corresponding bit location of the second shift registers and applying the results to the bit locations in the security code register.

9. The system according to claim 8 wherein the first pseudo random number generator is cycled a number of times depending on the contents of the first register.

10. The system according to claim 8 wherein the second pseudo random number generator is cycled a second number of times depending on the contents of the second register.

11. The system according to claim 8 further comprising a command code shift register, wherein the command code shift register contains a command code for performing a desirable function upon activation of the keyless entry system.

12. The system according to claim 8 further comprising a sequence code shift register, wherein the sequence code shift register contains a sequence count that is incremented each time the security code register is cycled.

13. The system according to claim 8 wherein the number of logic gates and bit locations in the security register is less than the number of bit locations in at least one of the first shift register or the second shift register.

14. The system according to claim 13 wherein the first shift register has 39 bit locations, the second shift register has 31 bit locations and the security code register has 28 bit locations.

15. In a remote keyless entry system including a transmitter for transmitting an encoded data signal in accordance with the data word contained in a pseudo random number generator and a receiver for initiating the performance of a predefined task upon the receipt of a valid encoded data signal, the method of changing said encoded data signal after a transmission comprising the steps of:
cycling said pseudo random number generator in a predetermined manner a number of times determined by the content of said generator so as to create a new data word in said generator; and
transmitting an encoded data signal in accordance with said new data word.

16. The method of claim 15 wherein the number of times said pseudo random generator is cycled is determined by the value of said data word when the cycling step is initiated.

17. The method of claim 15 wherein said pseudo random number generator includes a first shift register comprising a first plurality of bits and wherein the predetermined manner of cycling said generator includes combining a predetermined pair of said bits through a logic gate, inserting the output from said logic gate into the first bit location in said shift register, and shifting the contents of the shift register one bit location.

18. The method of claim 15 wherein said transmitter further includes a sequence counter, and further including the step of incrementing said sequence counter each time said cycling step is completed and a new data word is created in said generator.

19. The method of claim 18 wherein the step of transmitting said encoded data signal includes the step of transmitting the content of said sequence counter.

20. The method of claim 19 wherein the content of said sequence counter is transmitted in clear code.

21. The method of claim 15 wherein the data word in said pseudo random number generator comprises a plurality of bits and less than all of said plurality of bits is transmitted in said encoded data signal.

22. The method of claim 15 wherein said pseudo random number generator includes a first shift register that is cycled in a first predetermined manner a number of times determined by the content of said first shift register, a second shift register that is cycled in a second predetermined manner a number of times determined by the content of said second shift register, and a third shift register whose content is determined by a combination of said first and second shift registers.

23. The method of claim 22 wherein said encoded data signal includes the content of said third shift register after said cycling step.

24. In a remote keyless entry system including a transmitter for transmitting an encoded data signal in accordance with the data word contained in a pseudo random number generator and a receiver for initiating the performance of a predefined task upon the receipt of a valid encoded data signal, the method of changing said encoded data signal after a transmission comprising the steps of:
cycling said pseudo random number generator in accordance with a predetermined algorithmic process to produce a new data word;

incrementing a sequence counter each time said cycling step is completed and a new data word is produced; and transmitting the content of said sequence counter and an encoded data signal in accordance with said new data word.

25. The method of claim 24 wherein said pseudo random number generator includes a shift register comprising a plurality of bits greater than the number of bits in said encoded data signal.

26. The method of claim 25 wherein the content of said sequence counter is transmitted in clear code.

27. In a remote keyless entry system including a transmitter for transmitting an encoded data signal in accordance with an internally generated digital code word and a receiver for initiating the performance of a predefined task upon the receipt of a valid encoded data signal, the method of transmitting an encoded data signal comprising the steps of:

providing a pseudo random number generator containing a digital code word comprised of a first number of data bits;

cycling said pseudo random number generator in accordance with a predetermined algorithmic process to produce a new digital code word; and transmitting an encoded data signal in accordance with said new digital code word, wherein said encoded data signal contains a second number of encoded data bits less than said first number.

28. The method of claim 27 further including the step of incrementing a sequence counter in the transmitter each time a new digital code word is produced and wherein said transmitting step includes transmitting the content of said sequence counter.

29. The method of claim 27 wherein the number of times said generator is cycled to produce a new digital code word is determined by the content of the generator.

30. The method of claim 27 wherein said pseudo random number generator includes a first shift register having a first predetermined number of bits, a second shift register having a second predetermined number of bits, a plurality of logic gates for combining a corresponding plurality of bits from each of said first and second shift registers into a third shift register having a third predetermined number of bits, and further wherein said third predetermined number is less than at least one of said first or second predetermined numbers.

* * * * *